United States Patent [19]
Ozimec

[11] 3,841,546
[45] Oct. 15, 1974

[54] SOLDERING MACHINE
[75] Inventor: Stephen Ozimec, South Laguna, Calif.
[73] Assignee: Comtec Economation, Santa Ana, Calif.
[22] Filed: Sept. 26, 1972
[21] Appl. No.: 292,398

[52] U.S. Cl............ 228/6, 29/484, 219/85, 228/44
[51] Int. Cl................................ B23k 1/00
[58] Field of Search......... 228/4, 6, 44, 3.5; 219/85; 29/484

[56] References Cited
UNITED STATES PATENTS

| | | | |
|---|---|---|---|
| 2,404,730 | 7/1946 | Johansson et al. | 219/85 |
| 2,494,474 | 1/1950 | Fermanian et al. | 228/6 UX |
| 2,602,872 | 7/1952 | Ziegler | 228/3.5 UX |
| 2,894,112 | 7/1959 | Brescka | 219/85 |
| 3,094,764 | 6/1963 | Pohl | 219/85 X |
| 3,209,441 | 10/1965 | Ducharme et al. | 228/6 X |
| 3,717,742 | 2/1973 | Fottler | 219/85 |

Primary Examiner—J. Spencer Overholser
Assistant Examiner—Robert J. Craig
Attorney, Agent, or Firm—Smyth, Roston & Pavitt

[57] ABSTRACT

A soldering machine for attaching a wire member to a second member comprising a supporting structure, an endless flexible element mounted on the supporting structure for movement relative to the supporting structure, and a head mounted on the endless flexible element. The head includes a first set of jaws for holding the wire member and a second set of jaws for holding the second member. Both sets of jaws are normally held in a closed position. A soldering light provides heat for bonding the members together.

31 Claims, 28 Drawing Figures

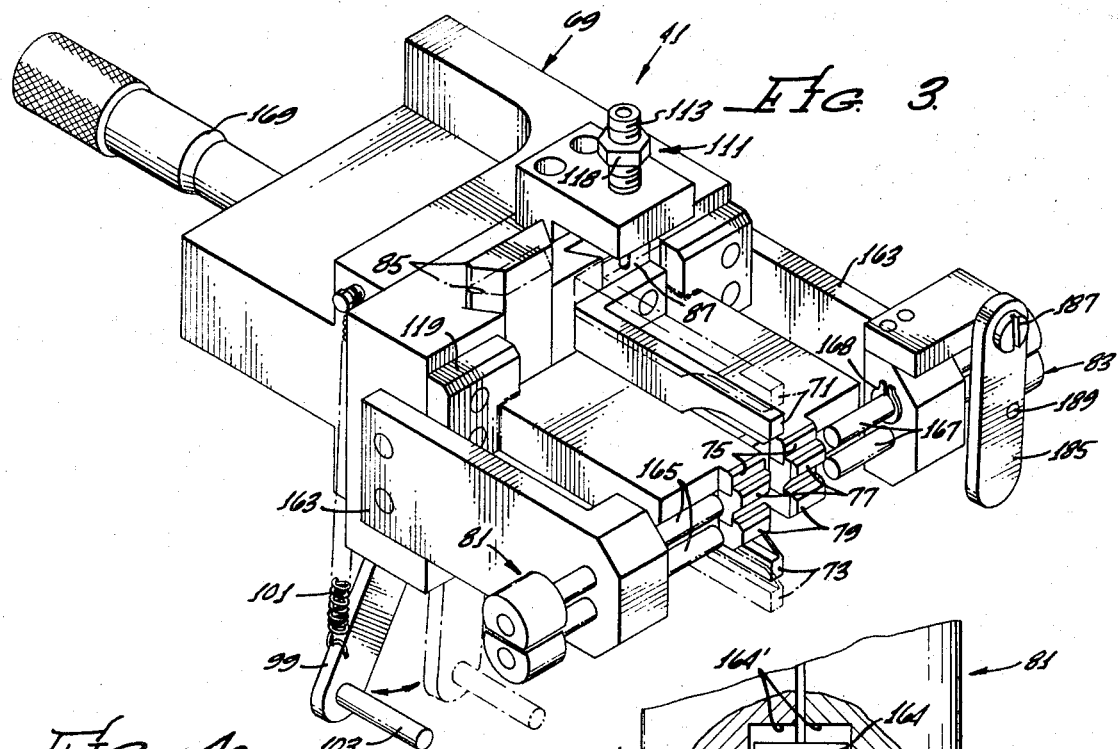
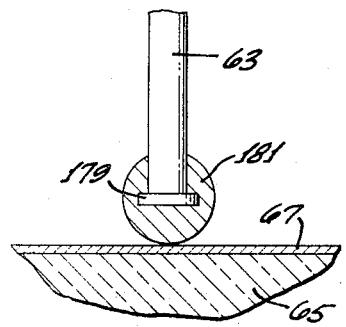
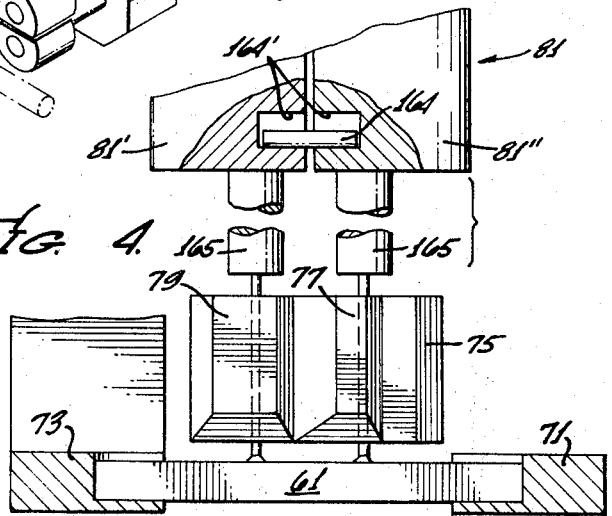
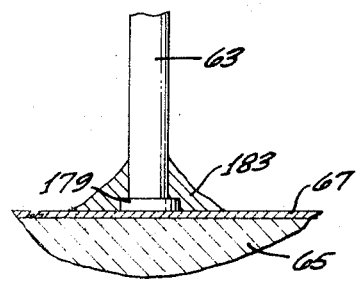
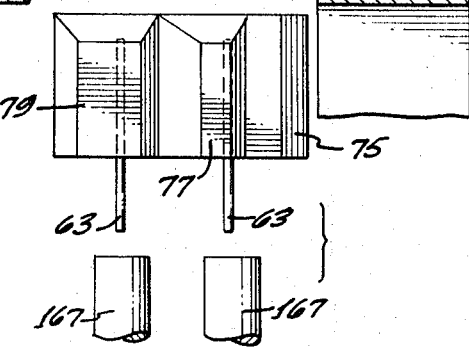

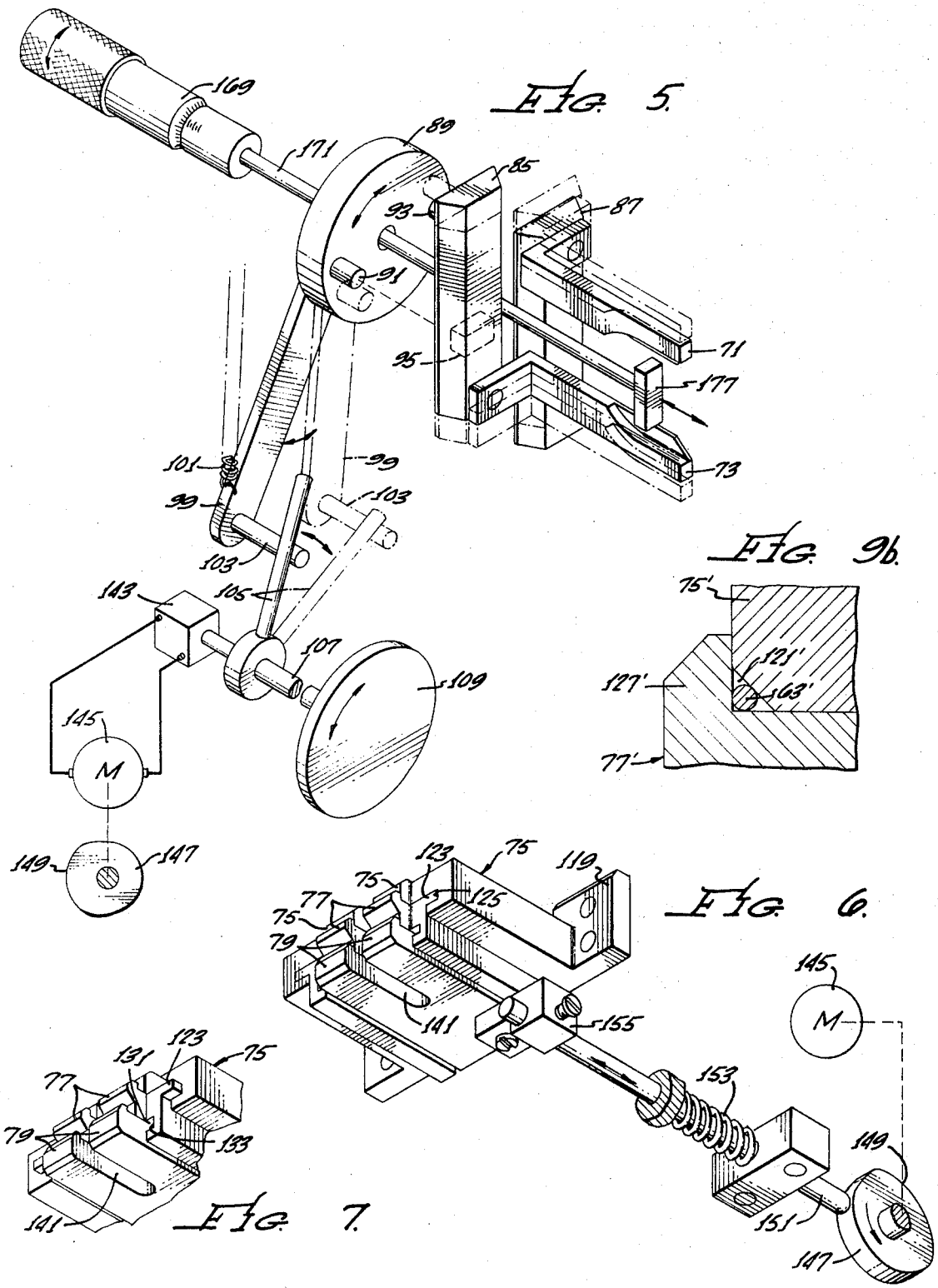

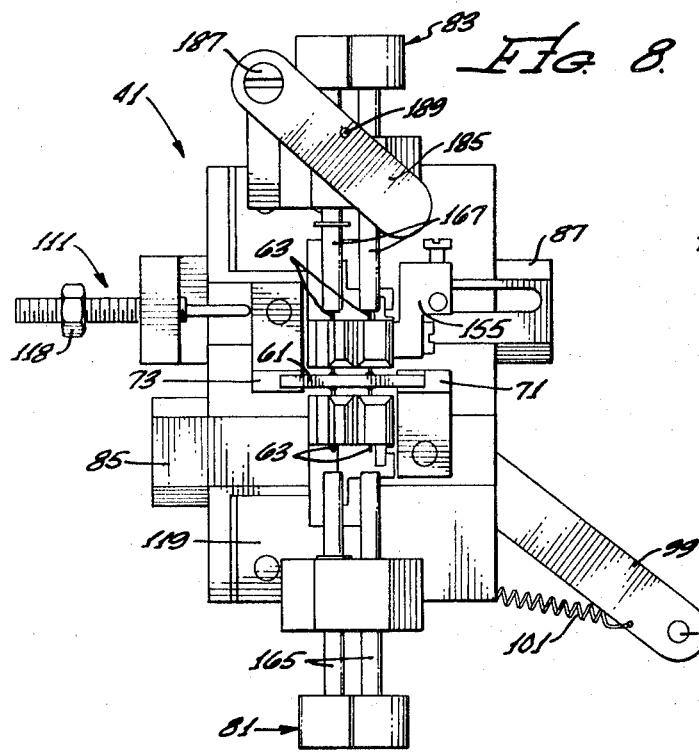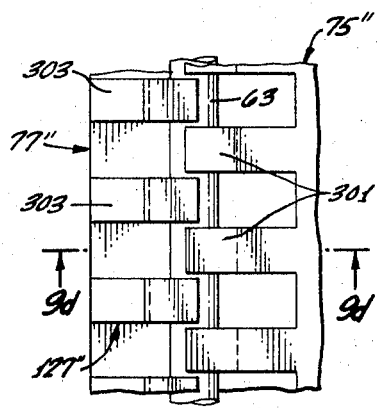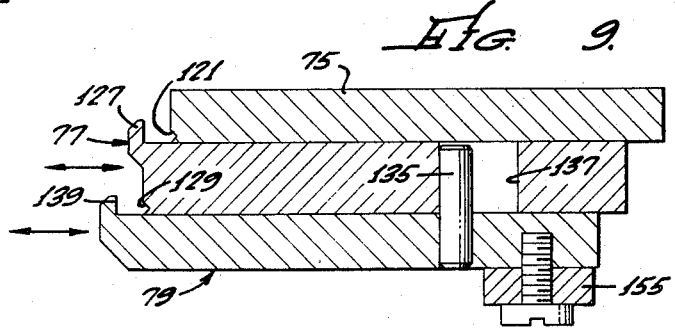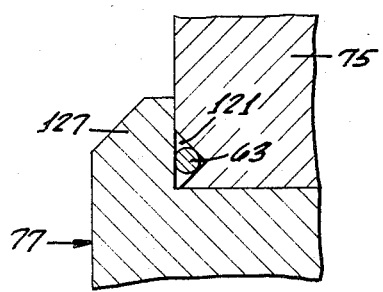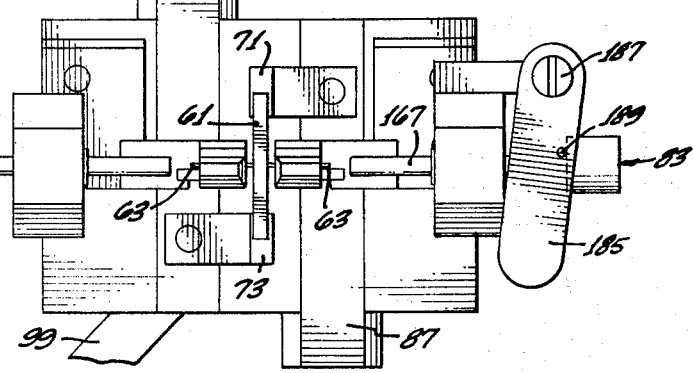

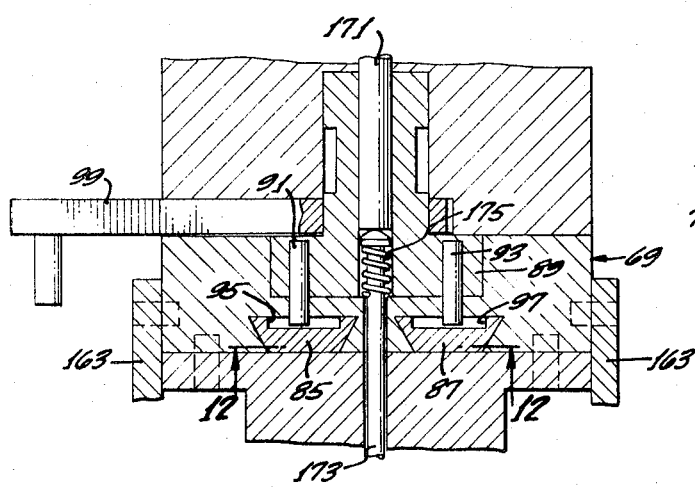
FIG. 11.
FIG. 12.
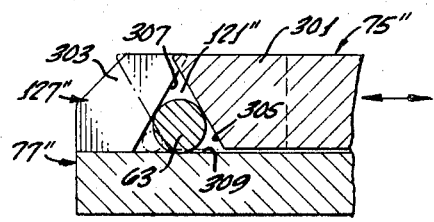
FIG. 9d.
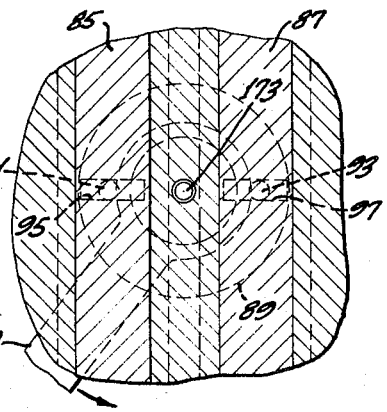
FIG. 9e.
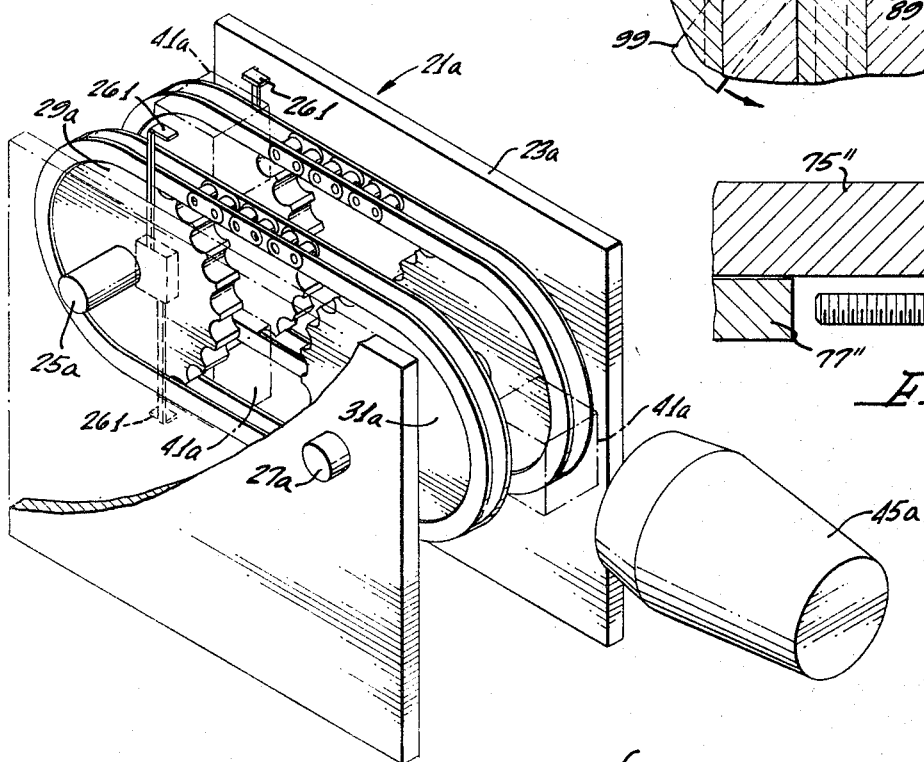
FIG. 13.

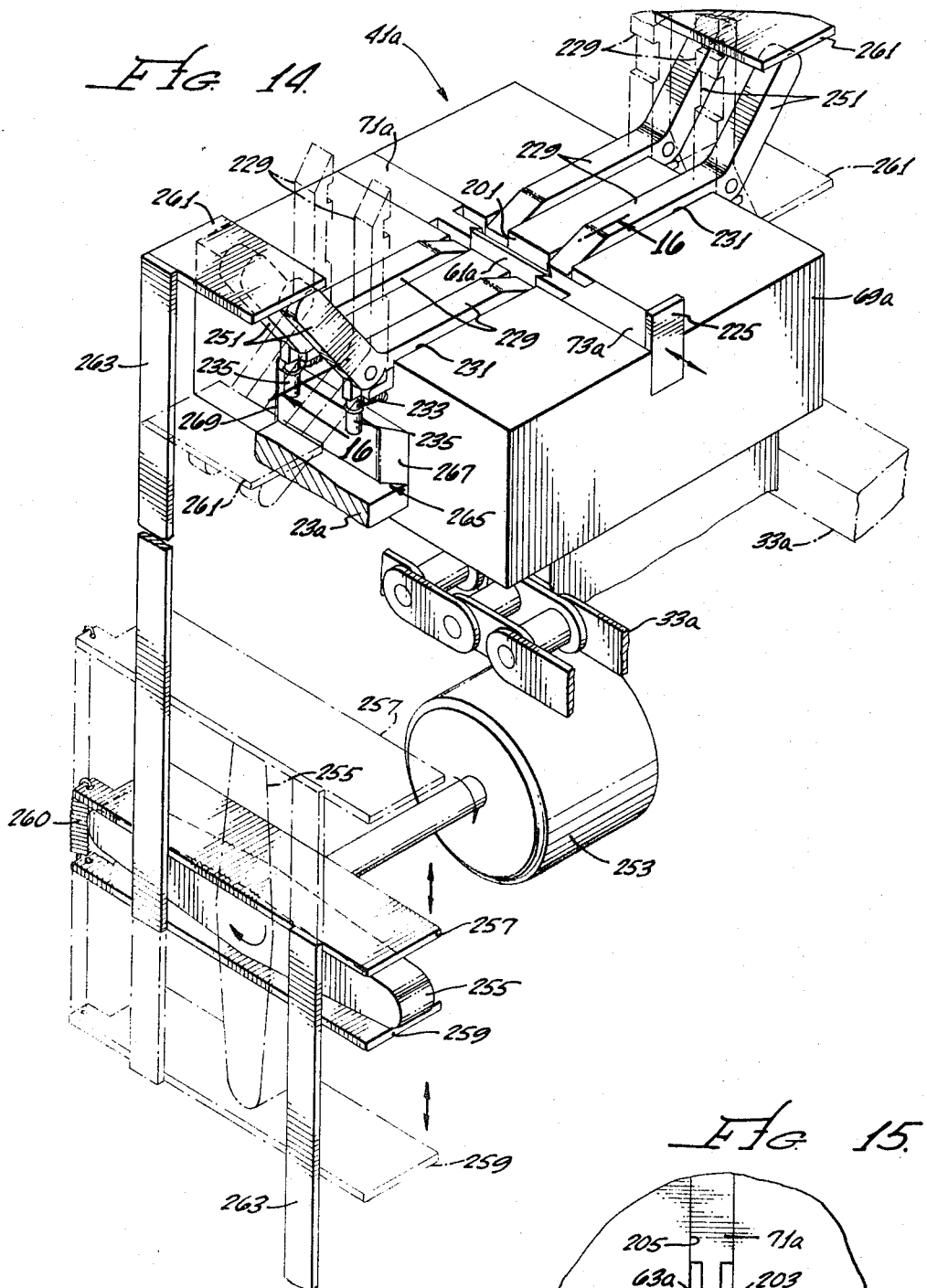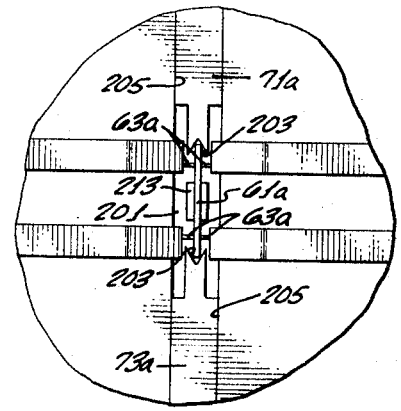

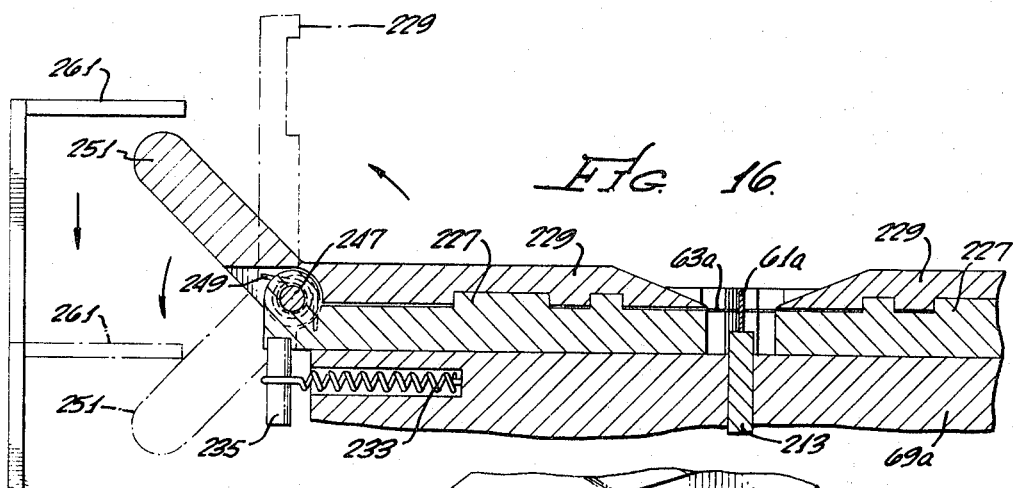
FIG. 16.
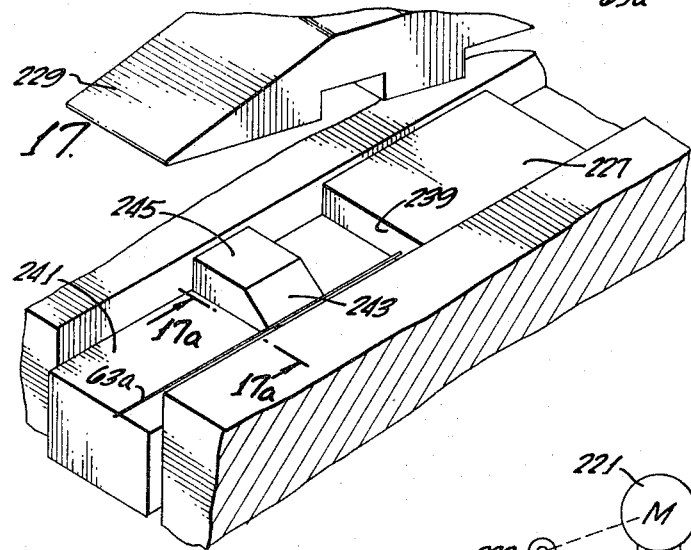
FIG. 17.
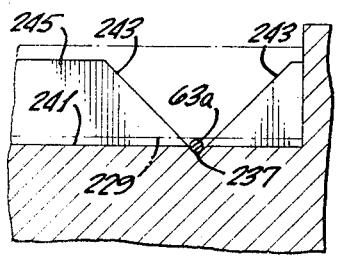
FIG. 17a.
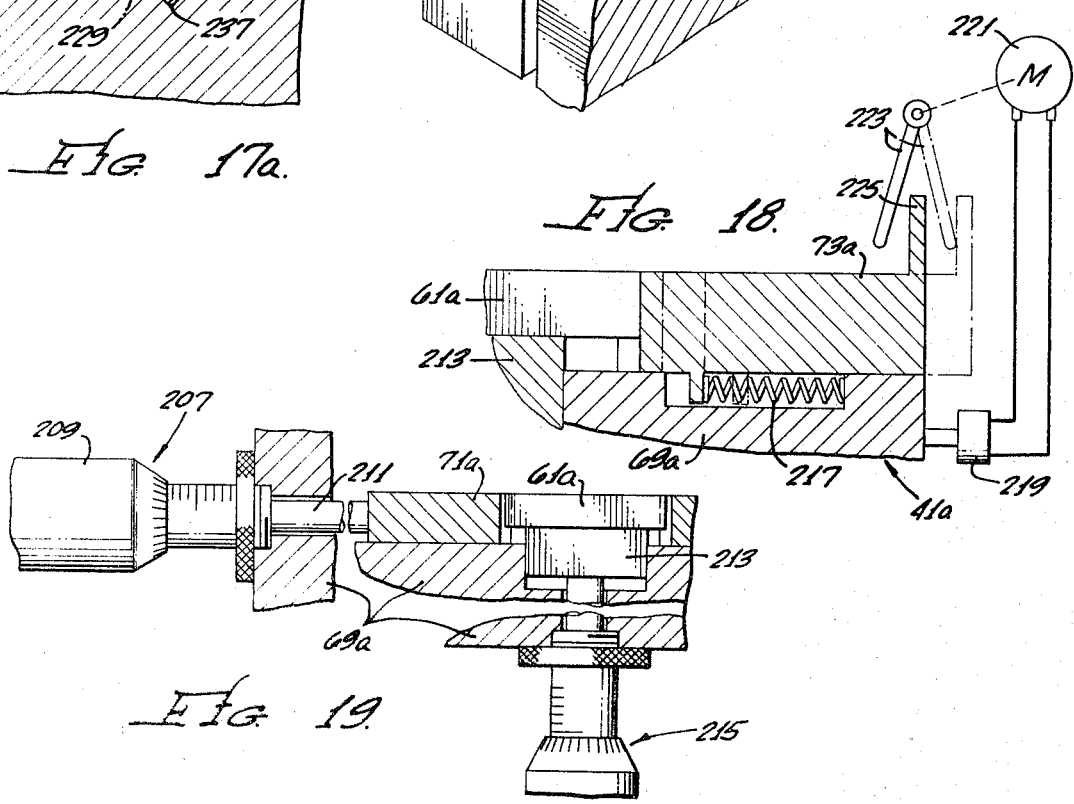
FIG. 18.
FIG. 19.

3,841,546

SOLDERING MACHINE

BACKGROUND OF THE INVENTION

A resonator of the type used, for example, in watches typically includes fine lead wires soldered to a crystal plate. The crystal plate typically includes a piezoelectric crystal having conductive electrodes attached to the piezoelectric crystal. The lead wires are soldered to the electrodes.

Ostensibly it would appear to be a simple matter to solder the small diameter lead wires to the crystal plate. However, because the lead wires are of extremely small diameter, for example .0035 inch, holding and positioning of the lead wires for the soldering operation is most difficult. Also, the lead wires must be carefully handled to avoid breaking.

In one prior art soldering operation, the lead wires are held in a hypodermic needle. This operation is very slow and not at all suited for mass production of resonators.

SUMMARY OF THE INVENTION

The present invention provides a machine which is capable of soldering or otherwise bonding a large number of small diameter wires per minute. The fine wires and the crystal plate can be rapidly loaded into, and unloaded from, the machine and no hypodermic needle holding technique is used. Although the present invention is adapted for soldering lead wires to a crystal plate, it may obviously be applied to soldering other members together. This invention is described with reference to soldering; however, the invention is applicable to various kinds of bonding, including welding and brazing, in which material is converted to a plastic state through the application of heat to effect a bond between two or more members.

With the present invention soldering occurs during both the loading and the unloading operations. This is advantageously accomplished by providing a machine which includes a supporting structure, an endless flexible element, and means for mounting the endless flexible element on the supporting structure for movement relative to the supporting structure in an endless path. The path passes through a loading station, a soldering station, and an unloading station. A plurality of heads are mounted on the endless flexible element for movement along the path and through the work stations. Each of the heads is capable of holding one or more lead wires and at least one crystal plate. The heads are spaced by an amount equal to the spacing between stations. With this arrangement, the soldering and loading and/or unloading operations can be carried out simultaneously with the result that the speed of operation is materially increased.

The crystal plate and the lead wires can advantageously be held in first and second sets of jaws which form part of each of the heads. Preferably both sets of jaws are normally resiliently biased toward a closed position in which jaws are in clamping relationship with a member to be soldered.

The heat for the soldering operation is preferably provided by a light. The endless flexible element is driven by a motor which stops automatically to appropriately position the heads at the stations. The soldering operation is initiated automatically in response to bringing one of the heads to the soldering station. The soldering operation is automatically terminated.

The present invention provides two preferred head constructions. According to one form of the invention, the head includes a weight for loading the lead wires against the crystal plate at least when the head is at the soldering station. The lead wires are preferably prefluxed, and the force provided by the weight forces the lead wires through the flux and into contact with the crystal plate to provide a strong connection. Specifically, the weight is mounted for movement along a path under the influence of gravity. When the head is at the soldering station, the weight is at the lower end of this path and retains the lead wires against the crystal plate. Preferably, the lead wires are located intermediate the weight and the crystal plate with the weight being above the wires at the soldering station.

In the usual case, lead wires are soldered to the opposite faces of the crystal plate. Accordingly, two weights and two soldering stations are provided with the crystal plate being inverted at the second soldering station.

In addition to two soldering stations, loading and unloading stations are provided. For this form of the invention, the loading and unloading stations can advantageously be combined into a single station, i.e., the loading and unloading function is carried out at a single station. Both sets of weights are automatically retracted from their associated lead wires at the combined loading and unloading stations.

Another advantage of this head is that the crystal jaws are self-centering so that the jaws automatically position the crystal plate at the same location regardless of the size of the crystal plate. This can advantageously be accomplished by a head which includes a body with reciprocable slides mounted on the body. The crystal plate holding jaws are mounted on the slides, respectively. The slides are moved in opposite directions by a rotary element which is also mounted on the body by moving the rotary element either manually or automatically at the combined loading and unloading stations. The jaws can be opened against the biasing force of the spring tending to close them.

The lead wires are held in sliding jaws which define a groove for receiving the lead wire. The jaws hold the lead wire with just enough looseness so that the weight can urge the lead wire into contact with the crystal plate.

According to another form of the invention which is adapted for very fine lead wires, e.g., .0035 inch diameter, the lead wires are retained between pivotable jaws. The pivotable jaws have an open position in which a lead wire can be loaded into the jaws and a closed position in which the jaws are in clamping engagement with the lead wire. Both of these jaws are urged as a unit toward the crystal plate by suitable means such as a spring. This provides a force for loading the lead wires against the crystal plate for soldering.

For this form of the invention, the loading and unloading stations can advantageously be separated into two distinct stations. Only a single soldering station is provided. A cam and cam follower are provided on the head and the supporting structure for automatically opening the wire holding jaws at both the loading and unloading stations. In addition, the crystal holding jaws can be automatically opened at the loading station. A cam and follower automatically retract the wire holding jaws at the loading station. Two positively prevent destruction of the wires or soldered connection, no such retraction function is carried out at the unloading station.

Another advantage of the invention is that the fine wire can be easily loaded into very shallow grooves in the wire holding jaws. In one form of the invention it is accomplished by guide surfaces and in the other by closure of the jaws.

The invention can best be understood by reference to the following description taken in connection with the accompaying illustrative drawings.

BRIEF DESCRIPTION OF THE DRAWINGS

FIG. 3 is a perspective view of the head.

FIG. 4 is an enlarged elevational view of a portion of the head at the first soldering station.

FIG. 4A is a fragmentary sectional view showing a pre-fluxed lead wire prior to attachment to the crystal plate.

FIG. 4B is a fragmentary sectional view similar to FIG. 4A showing the soldered connection between the lead wire and the crystal plate.

FIG. 5 is a partially schematic, partially exploded perspective view of the crystal holding jaws and the means for operating these jaws.

FIG. 6 is a perspective view of the wire holding jaws and the means for operating the wire holding jaws with the jaws being in the closed position.

FIG. 7 is a fragmentary perspective view of the wire holding jaws in the open position.

FIG. 8 is a front elevational view of the soldering machine at the other soldering station.

FIG. 9 is an enlarged sectional view through the wire holding jaws with the jaws being open.

FIG. 9a is an enlarged, fragmentary sectional view of the wire retaining portion of the wire holding jaws in the closed position.

FIG. 9b is a sectional view similar to FIG. 9a showing a second form of wire holding jaws.

FIG. 9c is a fragmentary plan view showing a third form of wire holding jaws.

FIG. 9d is a sectional view taken along line 9d—9d of FIG. 9c.

FIG. 9e is a fragmentary sectional view showing an adjustable stop for the wire holding jaws of FIG. 9c.

FIG. 10 is a front elevational view of the head at the loading and unloading station.

FIG. 11 is a fragmentary sectional view taken generally along line 11—11 of FIG. 3.

FIG. 12 is a sectional view taken generally along line 12—12 of FIG. 11.

FIG. 13 is a perspective view in somewhat schematic form of a second form of the present invention.

FIG. 14 is a perspective view of a second form of head usable with the soldering machine of FIG. 13.

FIG. 15 is a fragmentary top plan view of the head of FIG. 14.

FIG. 16 is a fragmentary sectional view taken generally along line 16—16 of FIG. 14.

FIG. 17 is a fragmentary perspective view with the wire holding jaws in the open position.

FIG. 17a is an enlarged fragmentary sectional view taken along line 17a—17a of FIG. 17.

FIG. 18 is a fragmentary sectional view of the movable crystal holding jaws with the mechanism for opening same being schematically illustrated.

FIG. 19 is a fragmentary view partially in section showing the means for adjusting the location of the crystal.

DESCRIPTION OF THE PREFERRED EMBODIMENT

Figure 1:
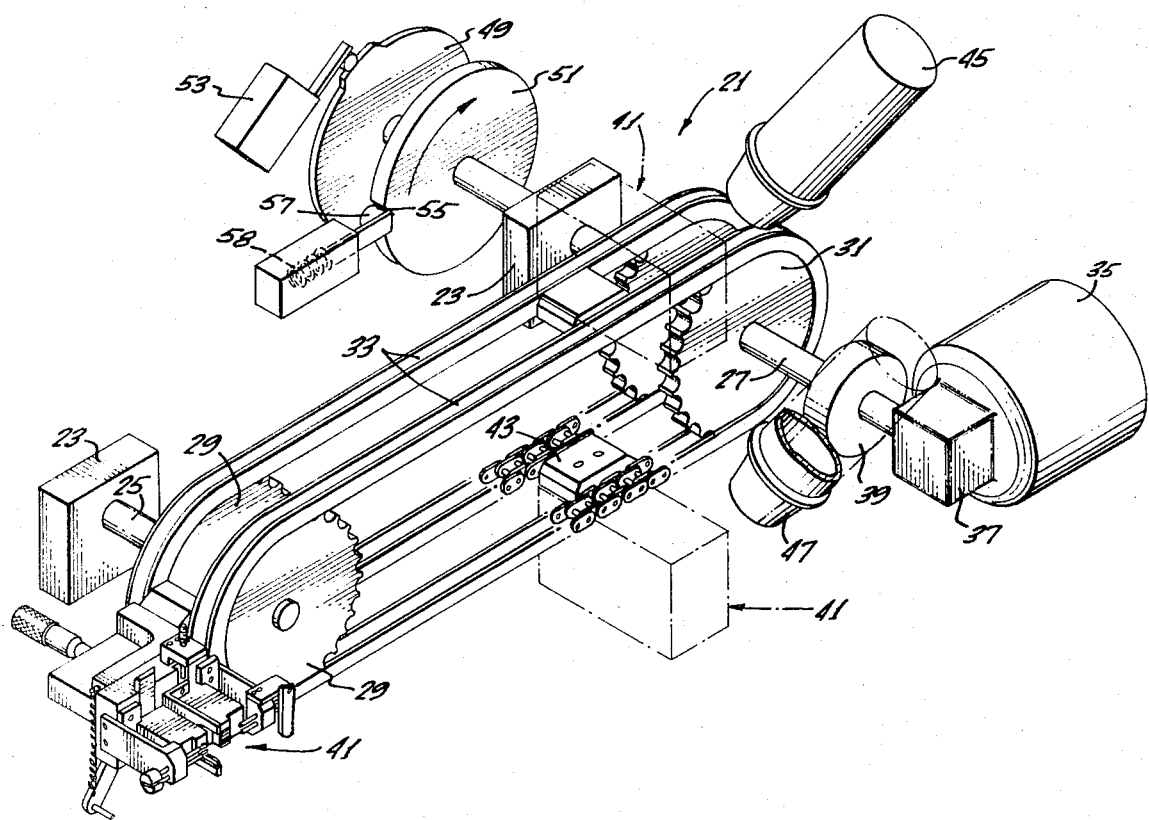
FIG. 1 is a perspective view in somewhat schematic form showing one preferred form of soldering machine constructed in accordance with the teachings of this invention.

FIG. 1 shows a soldering machine 21 constructed in accordance with the teachings of this invention. Generally the soldering machine 21 includes a suitable supporting structure 23 having shafts 25 and 27 rotatably mounted on the supporting structure. Two pairs of sprocket wheels 29 and 31 are mounted on the shafts 25 and 27, respectively. Endless flexible elements in the form of chains 33 extend between the sprocket wheels 29 and 31.

The shaft 27 is driven by an electric motor 35 through a gear box 37 and a magnetic clutch 39. The sprocket wheels 29 are driven by the sprockets 31 and the chains 33.

Three heads 41 of identical construction are suitably mounted on the chains 33 for movement therewith. Each of the heads 41 has a mounting plate 43 which is positioned between, and affixed to, both of the chains 33. Thus, the orientation of the heads 41 changes as the heads move around the sprockets 29 and 31.

In the embodiment of FIG. 1, the head 41 at the left is at a combined loading and unloading station, and this head is in a horizontal position. Although the loading and unloading stations could be separated, in this embodiment of the invention they are combined into a single station.

The head 41 on the top of the chains 33 is at an upper or first soldering station, and the head 41 at the bottom of the chains is at a lower or second soldering station. Soldering lights 45 and 47 perform soldering operations at the upper and lower soldering stations, respectively. The distance along the chains 33 between any two stations is equal, and in the embodiment illustrated, this distance corresponds to the distance the chains 33 are moved by one revolution of the sprockets 31.

To control the motor 35, the magnetic clutch 39, and the soldering lights 45 and 47, the shaft 27 drives a control cam 49 and a stopping cam 51. The control cam 49 operates a microswitch 53 once during each revolution of the cam. Actuation of the microswitch 53 de-energizes the motor 35 and opens the magnetic clutch 39. Thus, even though the motor 35 may turn slightly after being de-energized, the disengagement of the clutch 39 prevents any of this motion from being transmitted to the shaft 27. To lock the shafts 25 and 27 in position immediately upon disengagement of the clutch 39, the locking cam 51 has an abutment 55 which is engaged by a follower 57 suitably mounted on the supporting structure 23. The follower 57 is urged by a spring 58 against the cam 51. This provides a stop for the shaft 27 and the heads 41 at the instant the clutch 39 is disengaged. Thus, the follower 57 cooperates with the abutment 55 to accurately index the movements of the heads 41.

Actuation of the microswtich 53 by the cam 49 also turns on the lights 45 and 47. After a predetermined period of time sufficient to provide heat for the soldering operations, the lights 45 and 47 are turned off. After the joint has cooled, the motor 35 is started, the clutch 39 is engaged, and the sprockets 31 and the cams 49 and 51 are rotated through one additional revolution to move each of the heads 41 to the next station. When the motor 35 is restarted and the clutch 39 is engaged, the force of the spring 58 is overcome and the follower 57 is urged to a retracted position. The above-described cycle is then repeated.

The above-described control functions can be carried out manually or automatically in accordance with well-known techniques. For example, the microswitch 53 may turn on a timer (not shown) which controls the length of time that the lights 45 and 47 are on. When this timer times out, a second timer (not shown) may be turned on which establishes the length of the cooling period and when this latter timer times out, the motor 35 may be energized. As the electrical wiring for such automatic controls can be easily provided by those skilled in the art, no additional descriptive material is provided herein.

Figure 2A:
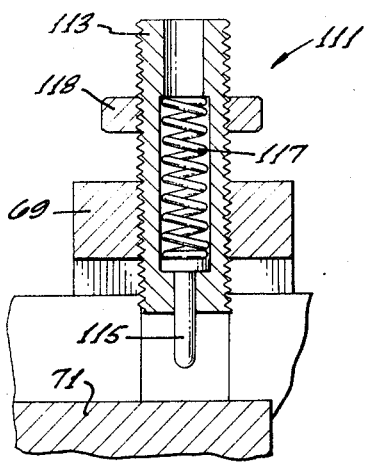
FIG. 2A is an enlarged sectional view of a two position stop.
Figure 2:
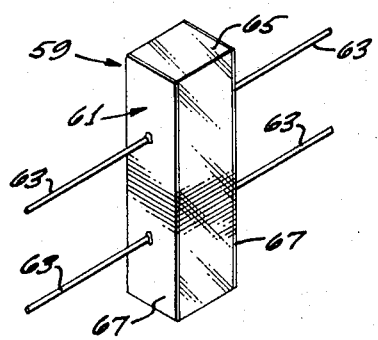
FIG. 2 is a perspective view of a resonator.

FIG. 2 shows a resonator 59 of the type for which the machine 21 is adapted for use. The resonator 59 includes a crystal plate 61 having a plurality of fine lead wires (four being illustrated) 63 attached thereto. The crystal plate 61 includes a crystal blank 65 of piezoelectric material such as quartz and conductive metal electrodes 67 suitably affixed to the opposite faces of the crystal blank 65. The lead wires 63 are soldered to the electrodes 67.

The details of the head 41 are shown in FIGS. 3-12. This head 41 is particularly adapted for soldering lead wires as small as .005 inch diameter to other members such as the electrodes 67. It should be understood that the soldering machine 21 may be used to solder together members other than the lead wires 63 and the electrodes 67.

Generally the head 41 includes a body 69, a self-centering crystal holding jaws 71 and 73, elements or wire holding jaws 75, 77, and 79, and weights 81 and 83 for urging the lead wires 63 into engagement with the electrodes 67 for the soldering operation. As shown in FIGS. 3, 5, 11 and 12, a pair of slides 85 and 87 are mounted in dove-tail slots of the body 69 for out of phase reciprocatory movement. The jaws 71 and 73 are suitably affixed to the slides 85 and 87 for movement therewith.

A rotary element in the form of a rotor 89 is mounted for oscillatory pivotal movement by the body 69. The rotor 89 carries pins 91 and 93 on opposite sides of the pivot axis thereof with the pins being partially received in slots 95 and 97, respectively, on the rear faces of the slides 85 and 87.

An actuating arm 99 is affixed to the rotor 89. A spring 101 (FIGS. 3 and 5) is attached to the arm 99 and to the body 69 and urges the arm in the clockwise direction as viewed in FIG. 3. This causes the pins 91 and 93 to drive the jaws 73 and 71 toward each other. Thus, the spring 103 normally resiliently biases the jaws 71 and 73 toward a closed position or toward a position in which it clampingly engages the opposite ends of the crystal plate 61. The jaws 71 and 73 have flanges 102 (FIG. 4) which assist in retaining the crystal plate 61.

The crystal holding jaws 71 and 73 can be opened by moving the arm 99 counterclockwise as viewed in FIG. 5. This can be accomplished manually or automatically at the loading and unloading station. FIG. 5 shows one preferred way of opening the jaws 71 and 73 at the loading and unloading station. To accomplish this, the arm 99 carries a pin 103 which is adapted to cooperate with a pin 105 carried by a shaft 107 suitably rotatably mounted on the supporting structure. The shaft 107 is manually rotated by a handwheel 109.

A two position stop 111 (FIGS. 2A and 3) limits the opening movement of the crystal holding jaws 71 and 73. The two position stop 111 is in the form of a spring biased detent which includes a housing 113, a detent 115, and a spring 117 for urging the detent outwardly.

In opening the crystal holding jaws 71 and 73, the operator may turn the handwheel 109 until the jaw 71 strikes the detent 115 so that the resistance of the spring 117 is felt. Alternatively, the handwheel 109 may be turned until the jaw 71 strokes the right abutment face formed by the lower face of the housing 111 (FIG. 2A). This is useful in that it is often desirable to open the jaws only slightly for the loading operation and to open the jaws a greater amount for unloading. The position of the housing 113 and hence of the entire two position stop 111 can be moved relative to the body 69 because of the threaded attachment of the housing to the body. The housing 113 can be locked in place by a nut 118.

The wire holding jaw 75 includes a pair of flanges 119 (FIGS. 3 and 6) for mounting the jaw 75 on the body 69. The jaw 75 is a fixed jaw and defines a groove 121 at its lower forward end (FIG. 9) for receiving one of the lead wires 63. The jaw 77 is mounted for sliding movement relative to the jaw 75 by a tongue 123 and a groove 125 (FIGS. 6 and 7). The jaw 77 has an upwardly extending retaining lip 127 and a groove 129 at its lower forward end for retaining one of the lead wires 63 (FIG. 9).

The lower jaw 79 is mounted on the jaw 77 for sliding movement by a tongue 131 and a groove 133 on the jaws 79 and 77, respectively. A pin 135 carried by the jaw 79 projects into a slot 137 in the jaw 77 (FIG. 9). The jaw 79 has a retaining lip 139 at the upper forward end thereof.

As shown in FIG. 9A, one of the lead wires 63 is adapted to be positioned in the groove 121 and retained therein by the retaining lip 127. Another lead wire 63 can be similarly retained in the groove 129 by the retaining lip 139. Closure of the wire loading jaws automatically loads the wires into the grooves 121 and 129. Moreover, as shown in FIGS. 3, 6, and 7, each of the jaws 75, 77, and 79 is bifurcated into two jaw sections having a slot 141 and the crystal plate 61 therebetween so that four lead wires 63 can be retained by these three jaws. The wire holding jaws accurately align the opposed lead wires 63. The groove 121 is sized relative to the diameter of the wire 63 such that the wire 63 can be moved axially of the wire. Other forms of retaining grooves for the wire 63 may be provided.

The movable jaws 77 and 79 can be moved between an open position (FIGS. 7 and 9) and a closed position (FIGS. 6 and 9A). To close the jaws, the lower movable jaw 79 is moved to the right as viewed in FIG. 9 relative to the jaws 75 and 77. The slot 137 accommodates the initial travel of the pin 135 to permit the jaw 79 to move relative to the jaw 77. The pin 135 strokes the righthand end of the slot 137 at the same time that the retaining lip 139 closes the groove 129. Thereafter, further movement of the jaw 79 to the right drives the movable jaw 77 to the right to close the groove 121 as shown in FIG. 9A.

This opening and closing of the wire holding jaws can be accomplished automatically or manually, and in the embodiment illustrated it is accomplished automatically in response to turning of the handwheel 109 (FIG. 5). With reference to FIGS. 5 and 6, turning of the handwheel 109 sufficiently to open the jaws 71 and 73 actuates a microswitch 143. This energizes a motor 145 which rotates a cam 147 through 180°. The cam 147 has a lobe 149 which forces a cam follower 151 to the left as viewed in FIG. 6 against the biasing action of a spring 153. The cam follower 151 is in the form of a rod, the opposite end of which is affixed by a mounting block 155 to the lower movable jaw 79.

This control system performs two important functions. First, it opens the wire holding jaws 75, 77, and 79. Secondly, it assures that the wire holding jaws will be opened only after opening of the crystal holding jaws 71 and 73. If the wire holding jaws were opened before the crystal holding jaws, movement of the groove 129 into the position shown in FIG. 9 would apply shearing forces to the lead wire 63 in the groove 129 which may tend to damage or break such lead wire.

The wire holding jaws 75, 77, and 79 remain in the open position until the motor 145 is again energized to rotate the cam 147 through another 180°. This may be accomplished manually or by a timer (not shown) or in any other manner known in the art.

The weights 81 and 83 are mounted on the brackets 63 which are affixed to the body 69. In the embodiment illustrated, the weight 81 includes two separate weight sections 81' and 81'' (FIG. 4). The weight sections 81' and 81'' are loosely interconnected by a pin 164 which is received in oversized blind bores 164 formed on the inner faces of the weight sections.

The weight sections 81' and 81'' are mounted on parallel shafts 165 respectively which are slidably mounted in the bracket 163. The shafts 165 are axially aligned with the grooves 121 and 129, respectively, when the jaws 75, 77, and 79 are in the closed position. Thus, the shafts 165 are in axial alignment with the lead wires 63 which are slidably mounted in the grooves 121 and 129. The weight 83 also includes two weight sections which are similarly mounted on shafts 167. The shafts 167 are in axial alignment with the lead wires 63 carried by the opposite sections of the jaws 75, 77, and 79. Suitable stops such as a retainer 168 (FIG. 3) prevent the shafts 165 and 167 from being withdrawn out of their respective brackets 163.

The crystal holding jaws 71 and 73 are self-centering so that regardless of the size of the crystal plate 61, the crystal will be located in the same position and the center of the crystal will be at the same location. The present invention provides means shown in FIGS. 5 and 9 for adjusting the location of the crystal plate 61 within the plane established by the jaws 71 and 73. Specifically, such means includes a conventional micrometer 169 suitably mounted for rotation on a shaft 171 carried by the body 69. By turning of the micrometer 169, the shaft 171 is moved axially to move a rod 173 (FIG. 11). The rod 173 is urged upwardly as viewed in FIG. 11 by a spring 175. A positioning plate 177 (FIG. 5) is attached to one end of the rod 173 (FIG. 5). The positioning plate 177 is adapted to engage the crystal plate 61 as shown in FIG. 4 for the purpose of adjusting the position of the crystal plate 61 in the plane established by the crystal holding jaws 71 and 73.

FIGS. 4a and 4b illustrate the type of soldering operation which the soldering machine 21 is particularly adapted to carry out. As shown in FIG. 4a, the lead wire 63 has a head 179 at the end thereof. The head 179 is embedded in a mass 181 of solder coated with flux. Prior to the soldering operation the solder 181 bears against the electrode 67.

During the soldering operation, sufficient heat is applied to the solder 181 to cause plastic flow thereof and simultaneously the lead 63 is urged axially toward the electrode 67 by the weight 81. When the solder 181 is in a plastic state, the axial force on the lead wire 63 urges the head 179 into engagement with the electrode 67. When the solder 181 hardens, it forms an attachment 183 as shown in FIG. 4b.

With the head 41 in the horizontal lefthand position shown in FIG. 1, the crystal holding jaws 71 and 73 can be opened by the handwheel 109 (FIG. 5), and the jaws 75, 77 and 79 are automatically opened after opening of the crystal holding jaws. This permits the operator to load the crystal plate 61 into the jaws 73 and to load the lead wires 63 into the jaws 75, 77 and 79. The crystal holding jaws 71 and 73 are manually closed by counter-rotation of the handwheel 109 and the jaws 75, 77 and 79 are closed by the motor 145 in response to a timer (not shown) or a manual input.

The chains 33 then move the head 41 which has just been loaded to the upper soldering station as described hereinabove. With the head 41 at the loading and unloading station the shafts 165 and 167 for the weights 81 and 83 are horizontal as shown in FIG. 10. However, with the head 41 at the upper soldering station of FIG. 1, the shafts 165 are vertical (FIG. 4). Accordingly, the weight 81 urges the shafts 165 downwardly and into engagement with the lead wires 63 thereby forcing these wires through the wire holding jaws 75, 77, and 79 into engagement with the upper face of the crystal plate 61. With the lead wires 63 contacting the crystal plate 61, the light 45 provides the heat for the soldering operation described hereinabove with reference to FIGS. 4A and 4B. The weight sections 81' and 81'' provide the axial force on the lead wires 63. The jaws 75, 77, and 79 support the wires against buckling and only a minimum length of the lead wires is unsupported. The shafts 167 and the associated lead wires 63 fall downwardly away from the lower face of the crystal plate 61.

The head 41 is then advanced to the lower soldering station (FIG. 8) and this causes the weight 83 to act in the same manner as the weight 81 at the upper soldering station. Thus, half of the lead wires 63 are soldered to the crystal plate 61 at the upper soldering station and the other half of the lead wires 63 are soldered to the crystal plate 61 at the other soldering station.

It is desired to move the weights 81 and 83 and the shafts 165 and 167 away from the associated lead wires 63 when the head 41 is at the loading and unloading station (the horizontal station shown in FIG. 1 and FIG. 16). The shafts 165 are out of contact with the associated lead wires 63 at the lower soldering station (FIG. 8) and thus remain out of contact with the lead wires in moving to the loading and unloading station. However, the shafts 167 tend to remain in contact with the associated lead wires 63 in moving from the lower soldering station (FIG. 8) to the loading and unloading station (FIG. 10). To overcome this tendency, the present invention provides an arm 185 (FIGS. 8 and 10) mounted on the body 69 by a suitable shaft 187. A pin 189 is carried by the arm 185.

When the head 41 is at the lower soldering station (FIG. 8), the arm 185 is pivoted downwardly so that the pin 189 is out of contact with the weights 83. However, when the head 41 is angularly displaced to the loading and the unloading station (FIG. 10), the arm 185 pivots under the influence of gravity about the shaft 187 in the counterclockwise direction as viewed in FIG. 10. This causes the pin 189 to bear against a face of the weight 183 to urge the latter to the right as viewed in FIG. 10 thereby displacing the shafts 167 from the lead wire 163.

FIG. 9b shows a modification of the elements or wire holding jaws. Portions of the wire holding jaws of FIG. 9b corresponding to portions of the wire holding jaws of FIGS. 9 and 9a are designated by corresponding primed reference numerals.

The jaws 75' and 77' are identical to the jaws 75 and 77 except that the groove 121' is defined by an inclined surface or chamfer on the jaw 75' and by the adjacent portions of the jaw 77'. One advantage of this construction is that it is easier to make than the construction shown in FIG. 9a. A groove corresponding to the groove 129 (FIG. 9) can be formed by following the teaching of FIG. 9b.

FIGS. 9c–9e show a third form of elements or wire holding jaws. Portions of the wire holding jaws of FIGS. 9c–9e corresponding to portions of the wire holding jaws of FIGS. 9 and 9a are designated by corresponding double primed reference numerals. One advantage of the wire holding jaws of FIGS. 9c–9e is that a single set of jaws may be used for wires of different diameters.

The jaw 75'' differs from the jaw 75 in that the left end thereof is castellated to define a plurality of spaced parallel, stationary, rake fingers 301. The movable jaw 77'' differs from the jaw 77 in that the retaining lip 127'' is castellated to form movable rake fingers 303. The rake fingers 301 and 303 define inclined surfaces 305 and 307 (FIG. 9d) which cooperate with a surface 309 of the jaw 77'' to define a groove 121'' of variable cross sectional area for retaining lead wire 63''. The lower portions of the jaw 77' may be castellated to form rake fingers for use in defining a groove which would correspond to the groove 129 of FIG. 9. Preferably the groove 121'' as viewed in FIG. 9 is in the form of an equilateral triangle. As shown in FIG. 9c, each of the rake fingers 301 fits between an adjacent pair of the rake fingers 303.

FIG. 9e shows an adjustable stop 311 which may be used to control the relative positions of the jaws 75'' and 77'' in the closed position thereof. By controlling this orientation, the size of the groove 121'' is automatically varied so that lead wires of different diameters can be accommodated by the same jaws. Of course, a similar adjustable stop may be used to control the orientation of the jaw 77'' relative to the jaw 79 (not shown in FIGS. 9b–9e) immediately therebelow.

FIg. 13 shows a soldering machine 21a which is similar to the soldering machine 21 (FIG. 1) and in which corresponding parts are designated by corresponding reference numerals followed by the letter a. The soldering machine 21a has only one soldering station and the hed 41a thereof is adapted for use with lead wires down to .0035 inch diameter whereas the head 41 is adapted for use with lead wires down to .005 inch diameter. The soldering machine 21a includes a supporting structure 23a and a chain and sprocket structure substantially as described herein with reference to FIG. 1. The shaft 21a may be driven in the same manner as the shaft 12 (FIG. 1), or it may be driven by a Geneva drive.

Three heads 41a are mounted on the chains 33a. In the position shown in FIG. 13, the head 41a at the right of the figure is at a soldering station, the uppermost head 41a is at a loading station and the lowermost head is at an unloading station.

Except for the construction of the head 41a and the manner in which the jaws thereof are opened and closed, the embodiment of FIGS. 13–19 is substantially identical to the embodiment of FIGS. 1–12.

Turning to FIG. 14, all of the heads 41a are identical. Each of the heads 41a includes a body 69a, a portion of which lies between and is attached to the chains 33a for movement therewith. The body 69a provides a recess 201 (FIGS. 14 and 15) for receiving a crystal plate 61a. The crystal plate 61a is retained by crystal holding jaws 71a and 73a, each of which has a groove 203 for receiving an opposite edge portion of the crystal plate 61a.

The crystal holding jaws 71a and 73a are mounted in aligned slots 205 (FIG. 15) formed in the upper face of the body 69a. The crystal holding jaw 71a is basically a fixed jaw except that its position in its slot 205 can be adjusted by a micrometer 207 (FIG. 19) of conventional construction. As shown in FIG. 19, by turning of a handle portion 209 of the micrometer 207, a rod 211 suitably coupled to the jaw 71a can be advanced or retracted in the slot 205. The micrometer 207 is appropriately calibrated so that the position of the movable jaw 71a is accurately known by the operator. By being able to manually move the jaw 71a, the head 41a can position the crystal plate 61a as desired along the axes of the slots 205.

The crystal plate 61a can also be moved along an axis transverse to the axis of the slots 205. As shown in FIGS. 15 and 19, the crystal plate 61a rests on a pedestal 213 in the recess 201. The pedestal 213 can be advanced or retracted by a micrometer 215 in the same manner described above with reference to the micrometer 207. Thus, the micrometers 207 and 215 can be used to adjust the position of the crystal plate 61a and the head 41a, is, therefore, adapted for use with crystal plates of different sizes.

The jaw 73a is urged by a spring 217 (FIG 18) toward the jaw 71a. Thus, the jaws 71a and 73a normally clamp the crystal plate 61a. The jaw 73a may be retracted against the force of the spring 217 manually or automatically. By way of example, when the head 41a reaches a station such as the loading and/or unloading station at which it is desired to open the jaws 71a and 73a, the head 41a may engage a microswitch 219 which energizes a motor 221 to rotate a pin 223. The pin 223 cooperates with a tab 225 on the jaw 73a to open the jaws. The jaw 73a may be allowed to close after a preset time interval or it may be allowed to close in response to a manual reset operation initiated by the operator.

In the embodiment illustrated, the head 41a includes four identical sets of elements or wire holding jaws with each of the sets including an element or lower wire holding jaw 227 (FIG. 16) and an element or upper wire holding jaw 229. Each set of wire holding jaws is mounted for sliding movement in a slot 231 formed in the upper face of the body 69a. In the embodiment illustrated, the sets of wire holding jaws are arranged in opposed axially aligned pairs; however, other arrangements may be utilized if desired. Each set of wire holding jaws is suitable in its slot 231 toward and away from the crystal plate 61a. As shown in FIG. 16, a spring 233 is connected at one end to the body 69a and at the other end to a pin 235 on the lower wire holding jaw 227 for the purpose of biasing the jaw 227 inwardly toward the crystal plate 61a.

Each of the lower wire holding jaws 227 has a wire retaining groove 237 (FIG. 17A) extending longitudinally thereof from an abutment 239 (FIG. 17) to the end of the jaw. The groove 237 is very small so that a fine diameter lead wire 63 placed therein will project above a surface 241 which defines the upper edges of the groove 237. To facilitate insertion of the fine diameter lead wire 63a in the groove 237, guide surfaces 43 are provided in a block section 245 which is integral with the jaw 227. The guide surfaces 243 extend for less than the full axial length of the groove 237 and effectively increase the depth of the groove 237 for a short axial distance. The grooves 237 in opposed sets of wire holding jaws are axially aligned.

The upper wire holding jaw 227 is suitably pivotally mounted on the lower wire holding jaw 229 as by a pin 247 (FIG. 16). A spring 249 resiliently biases the upper wire holding jaw 229 toward the lower wire holding jaw 227. In the closed position of the wire holding jaws, the jaws 227 and 229 clampingly engage the head wire 63a (FIGS. 16 and 17A) and retain the latter against movement relative to the jaws 227 and 229. In order that the wire 63a can be so clamped, it is necessary that the groove 237 be sufficiently shallow to allow the wire 63a to project thereabove as shown in FIG. 17A; however, the groove must be deep enough relative to the diameter of the lead wire to accurately locate it. The upper wire holding jaw 229 substantially mates with the lower wire holding jaw as shown in FIGS. 16 and 17 except that the upper wire holding jaw has no groove for receiving the wire 63a.

The upper wire holding jaw 229 must be pivoted against the biasing force of the spring 249 to the open position at both the loading and unloading stations. Although this can be accomplished manually, in the embodiment illustrated it is accomplished automatically by the mechanism shown in FIG. 14. The head 41a shown in FIG. 14 may be assumed to be at the loading station and another lead (not shown) immediately therebelow is at the unloading station. The head 41a at the unloading station is inverted relative to the head shown in FIG. 14.

When the head 41a arrives at the loading station, a motor 253 is energized either manually or automatically. The motor 253 turns a cam 255 through 90°. Plate-like cam followers 257 and 259 are urged apart to the positions shown in phantom lines in FIG. 14 by such rotary motion of the cam 255. The cam followers 257 and 259 are biased toward each other by one or more springs 260. The downward movement of the cam follower 259 is transmitted to a plate 261 in any suitable manner such as by a bar 263. The plate 261 bears against the actuating arm 251 to pivot wire holding jaw 229 to the phantom position shown in FIGS. 14 and 16. As shown in FIG. 14, one of the plates 261 actuates an adjacent pair of the jaws 229 and an identical plate 261 operated by an identical mechanism opens the other pair of wire holding jaws.

The upward movement of the cam follower 257 is similarly transmitted to the arm 251 of the head 41a at the unloading station so that all of the wire loading jaws of the head 41a at the unloading station are simultaneously open. With the wire holding jaws and the crystal holding jaws of the head 41a at the unloading station open, the crystal plate 61a with the lead wires 63a soldered thereto falls out of the head into an appropriate receptacle (not shown).

At the loading station, it is desirable to axially retract all of the wire holding jaws 227 and 229. Although this could be accomplished manually, in the embodiment illustrated a cam 265 having identical ramp surfaces 267 and 269 at the opposite ends thereof is appropriately mounted and oriented on the supporting structure 23a. As the head 41a is moved into the loading station, the pin 235 (FIGS. 14 and 16) engages and rides up on the ramp surface 267. In this manner the set of wire holding jaws 227 and 229 which the pin 235 is attached is moved progressively to the retracted position. As the head 41a continues to move, the pin 235 attached to the trailing set of wire holding jaws is similarly cammed to a retracted position. An identical cam 265 is located on the opposite side of the head 41a for cooperation with the wire holding jaws 227 and 229 on the opposite side of the crystal plate 61a. As there is no crystal plate 61a or lead wire 63a in the head 41a at the loading station, the retracting movement of the wire holding jaws 227 and 229 can have no adverse effect on the work piece.

Thus, at the loading station, the jaws 229 are automatically pivoted to an open position and the jaws 227 and 229 are automatically moved to and held in the retracted position by the cam 265. The head 41a actuates the microswitch 219 (FIG. 18) at the loading station to automatically cause retraction of the jaw 73a. Accordingly, a crystal plate 61a can be positioned between the crystal holding jaws 71a and 73a. In addition, lead wire 63a can be easily positioned in the groove 237 (FIG. 17A) utilizing the guide surfaces 243.

After a predetermined period of time or as controlled by the operator, the motor 253 (FIG. 14) rotates a second 90° to return the plates 261 to the position shown in full lines in FIG. 14. This allows the springs 249 to pivot their respective upper wire holding jaws 229 to the closed position. Subsequently, either automatically or under the control of the operator, the restraint imposed by the pin 223 on the tab 225 (FIG. 18) is removed to allow the spring 217 to move the jaw 73a into clamping relationship with the crystal plate 61a.

The chains 33a are then appropriately indexed to moved the head 41a to the soldering station at which the light 45a solders all of the leads 63a to the crystal plate 61a substantially as described hereinabove. The head 41a is then indexed to the unloading position at which the apparatus shown in FIG. 18 automatically opens the crystal holding jaws 71a and 73a. In addition, the motor 253 is energized to open the wire holding jaws 227 and 229 to allow the crystal plate 61a with the lead wires 63a soldered thereto to drop out of the head into an appropriate receptacle (not shown). This cycle of operation can then be repeated.

Although exemplary embodiments of this invention have been shown and described, many changes, modifications and substitutions may be made by one having ordinary skill in the art without necessarily departing from the spirit and scope of this invention.

I claim:

1. A machine for attaching a wire member to a second member comprising:
a supporting structure;
an endless flexible element;
means for mounting said flexible element on said supporting structure for movement relative to said supporting structure in an endless path, said path passing through a first station and a bonding station;
a head mounted on said endless flexible element for movement therewith along said path and through said stations;
said head including a first set of jaws, said first set of jaws including a first jaw and a second jaw adapted to have the wire member therebetween, at least one of said first jaw and second jaw being movable toward and away from the other of said first and second jaws to facilitate loading of the wire member into said first set of jaws, said head including a second set of jaws for releasably holding the second member, and means for urging said members into close proximity at least when the head is at said bonding station; and
a heat source at said bonding station for providing heat for use in bonding said wire member and said second member together.

2. A machine as defined in claim 1 wherein said means for urging applies a force to said wire member axially thereof to urge said wire member toward said second member at least when said head is at said bonding station.

3. A machine for attaching a wire member to a second member comprising:
first and second elements adapted to have the wire member positioned therebetween;
said first element having a groove therein for at least partially receiving the wire member, said groove opening toward at least a portion of said second element whereby the wire member is adapted to lie between said elements when the wire member is in said groove;
at least one of said elements including at least one guide surface for guiding the wire member into said groove to thereby facilitate loading of the wire member into said groove;
means for releasably retaining the second member adjacent the wire member when the wire member is in said groove; and
means for bonding the members together.

4. A machine as defined in claim 1 wherein said first jaw has a groove for at least partially receiving the wire member therein, said second jaw holding the wire member at least partially in the groove.

5. A machine as defined in claim 4 wherein said second set of jaws includes first and second jaws and spring means for urging said jaws into clamping relationship with the second member, said heat source includes a light for providing heat for the bonding operation, a motor for driving said endless flexible element along said path, means for automatically stopping said motor when said head reaches said bonding station, means responsive to the head being in said bonding station to turn said light on, a second head mounted on said endless flexible element and spaced from said first mentioned head along said endless flexible element an amount equal to the spacing along said endless flexible element between said first station and said bonding station.

6. A machine as defined in claim 1 wherein said head includes a body on which said sets of jaws are mounted, a positioning member mounted for movement on said body and engageable with the second member to adjust the position of the second member in the second set of jaws.

7. A machine as defined in claim 1 wherein said first set of jaws mounts the wire member for movement toward the second member and said means for urging includes a weight mounted for movement, said weight being oriented at least in the bonding position so that the weight under the influence of gravity urges the wire member toward and into close proximity with the second member.

8. A machine as defined in claim 1 wherein said first and second jaws are pivotally connected for movement between an open position and a closed position in which the wire member is between said jaws, said first and second jaws being mounted for movement together in a direction to move the wire member toward and away from the second member, and said means for urging includes means for resiliently urging the first and second jaws in a direction to move the wire member toward the second member.

9. A machine as defined in claim 1 wherein said second set of jaws is self centering.

10. A machine for attaching members comprising:
a supporting structure;
a head;
said head including first means for retaining a first of the members and second means for retaining a second of the members for movement toward and into close proximity with the first member;
said head including a weight and means for mounting said weight for movement along a path under the influence of gravity;
means for mounting said head on said supporting structure for movement between a loading position in which said members can be loaded into said first and second means, respectively, and a bonding position in which the weight of said weight holds the second member in close proximity with the first members;
means for bonding said members together when said head in in said bonding position; and
means for automatically retracting the weight from the second member at least when the head is in the loading position.

11. A machine as defined in claim 10 wherein said second retaining means retains said second member between the first member and the weight, said weight being above said second member in said bonding position and driving the second member into close proximity with the second member.

12. A machine as defined in claim 3 wherein said one element is said first element and said one guide surface is a first guide surface, said first element including a second guide surface, said first and second guide surfaces extending for less than the full axial length of said groove and effectively increasing the depth of said groove along a region of said groove.

13. A machine as defined in claim 10 wherein said head includes third means for retaining a third of the members for movement toward and into close proximity with the side of the said first member which is opposite to said second member, said head including a second weight and means for mounting said second weight for movement along a second path under the influence of gravity, said head mounting means mounting the head for movement to a second bonding position in which the weight of the second weight holds the third member in close proximity to the first member.

14. A machine as defined in claim 10 wherein said second means includes a pair of self centering jaws.

15. A machine as defined in claim 10 wherein the first member is a wire and said second retaining means includes first and second jaws defining a groove for retaining said wire, at least one of said jaws being movable toward and away from the other of said jaws.

16. A machine as defined in claim 10 wherein said head includes a body and first and second slides mounted in said body for reciprocating movement, said first retaining means including first and second jaws mounted on said first and second slides, respectively, for movement with said slides, and means for moving said slides in opposite directions to thereby move said jaws into clamping relationship with said first member.

17. A machine as defined in claim 16 wherein said means for moving said slides includes a rotary element mounted on said body for movement about a pivotal axis, first coupling means for coupling said rotary element to said first slide, second coupling means for coupling said rotary element to said second slide, said first and second coupling means being spaced so that pivotal movement of said rotary element in a first direction moves said slides in opposite directions.

18. A machine for attaching a wire member to a second member comprising:
a body;
a first set of jaws mounted on said body for movement into and out of clamping relationship with the second member;
means for releasably holding the first set of jaws in clamping relationship with said second member to thereby releasably retain the second member on said body;
a second set of jaws including first and second jaws and means for connecting said first and second jaws for pivotal movement between an open position in which the wire member can be loaded into or unloaded from said second set of jaws and a closed position in which the first and second jaws are adapted to have the wire member therebetween;
means for releasably holding said second set of jaws in the closed position;
means for mounting said second set of jaws on said body for movement along a path between an advanced position in which the wire member is in close proximity to the second member and a retracted position in which the wire member is retracted from the advanced position;
releasable means for holding said second set of jaws in the advanced position; and
means for bonding the members together.

19. A machine as defined in claim 18 wherein said first set of jaws includes third and fourth jaws mounted in opposed relationship on said body, said third jaw being movable and away from said fourth jaw, said path extending generally transverse to the path of movement of said third jaw.

20. A machine as defined in claim 18 including a supporting structure, means for mounting said body on said supporting structure for movement between a first station and a bonding station, said bonding means being located at said bonding station, means responsive to the head being at said first station for automatically moving said first and second jaws to said open position thereof and for moving said second set of jaws to said retracted position.

21. A machine as defined in claim 20 wherein said releasable means for holding the second set of jaws in the advanced position includes resilient means for holding the second set of jaws in the advanced position, said means for moving said second set of jaws to said retracted position includes a cam carried by the supporting structure and a cam follower carried by said second set of jaws, said cam follower being engageable with said cam at said first station.

22. A machine as defined in claim 20 including an arm on said first jaw, an actuating element mounted for movement on said supporting structure at said first station and engageable with said arm when said head is at said first station, and means for moving said actuating element when said head is at said first station to thereby pivot said first jaw and move said first and second jaws to said open position.

23. A machine as defined in claim 18 wherein said second set of jaws define a shallow groove for partially receiving the wire member and guide surfaces for guiding the wire member into the groove.

24. A machine as defined in claim 4 wherein said first and second jaws are movable between open and closed positions and said first set of jaws includes means responsive to movement of said first and second jaws to said closed position for automatically moving said wire member into said groove.

25. A machine as defined in claim 1 wherein said first set of jaws define a groove for retaining the wire member, said head including means for varying the cross sectional area of said groove to thereby permit said jaws to accommodate wire members of different thicknesses.

26. A machine as defined in claim 3 including means for mounting said second element for pivotal movement toward and away from said first element.

27. A machine as defined in claim 3 including means for moving at least one of said members toward the other of said members.

28. A machine for attaching a wire member to a second member comprising:
a supporting structure;
an endless flexible element;
means for mounting said flexible element on said supporting structure for movement relative to said supporting structure in an endless path, said path passing through a loading station, a bonding station, and an unloading station;
a head mounted on said endless flexible element for movement therewith along said path and through said stations;

said head including first releasable means for releasably holding the second member and second releasable means for releasably positioning the wire member adjacent to the second member;

a heat source at said bonding station for providing heat for use in bonding said wire member and said second member together;

said head being oriented at said loading station so that said members do not fall therefrom under the influence of gravity even with said first and second releasable means released; and said head being oriented at said unloading station so that said members drop therefrom under the influence of gravity when said first and second releasable means are released to thereby unload the members from the head.

29. A machine as defined in claim 28 including means responsive to said head being located at said unloading station for automatically releasing said first and second releasable means whereby said members are automatically unloaded.

30. A machine as defined in claim 28 wherein said second releasable means includes first and second elements, said first element having a groove for at least partially receiving the wire member therein, at least one of said elements having at least one guide surface for guiding the wire member into said groove to thereby facilitate loading of the wire member into said groove, the wire member lying between said first and second elements when the wire member is in said groove, said elements being relatively movable to permit loading and unloading of the wire member from said groove.

31. A machine for bonding a wire member to a second member comprising:

a body;

means on said body for holding the second member;

first and second elements co-operable to confine the wire member;

means for mounting said first and second elements on said body, at least one of said elements being pivotable relative to the other of said elements between an open position in which the wire member can be loaded into or unloaded from said elements and a closed position in which the wire member lies between said elements and is confined thereby;

means on said body for allowing movement of at least one of the members toward the other of the members to a position in which the members are sufficiently close to permit bonding thereof; and means for bonding the members together.

* * * * *